Oct. 26, 1937.   H. R. DIETLEIN   2,096,884
DISPLAY DEVICE
Filed April 8, 1937   2 Sheets-Sheet 1
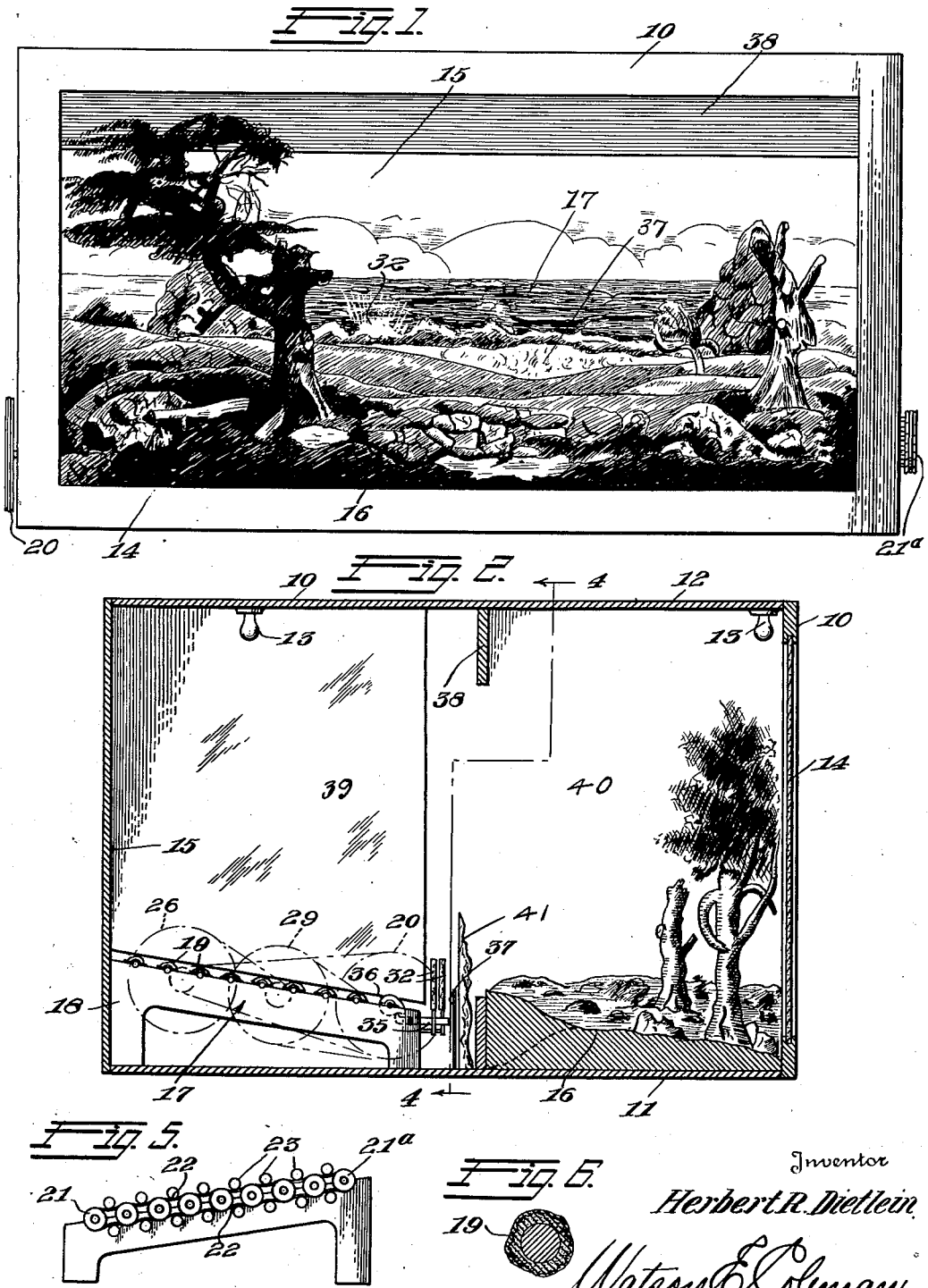

Oct. 26, 1937.     H. R. DIETLEIN     2,096,884
DISPLAY DEVICE
Filed April 8, 1937     2 Sheets-Sheet 2
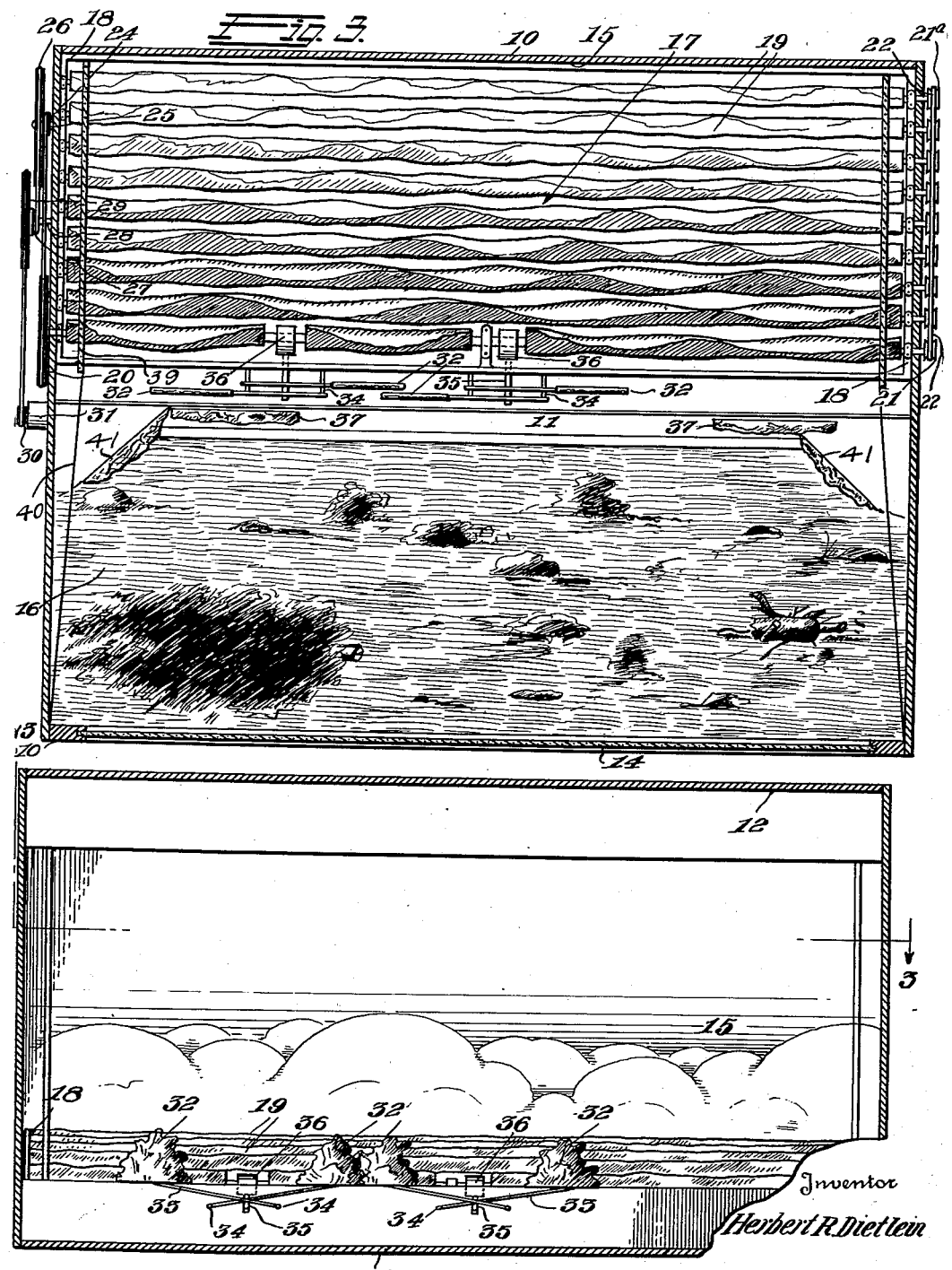

Patented Oct. 26, 1937

2,096,884

UNITED STATES PATENT OFFICE 2,096,884

DISPLAY DEVICE

Herbert R. Dietlein, Vancouver, Wash.

Application April 8, 1937, Serial No. 135,786

11 Claims. (Cl. 40—76)

This invention relates to display devices and particularly to a display device which includes as its principal feature a seascape having a foreground, a background and middle distance constructed to represent waves, rollers and breakers.

One object of this invention is to form the middle distance to simulate oncoming waves by the provision of a plurality of parallel rollers covered exteriorly with plastic material to simulate the details of more or less breaking waves, whitecaps and breakers, and provide means whereby these rollers may be rotated all in the same direction to simulate beachward rolling waves.

Another object is to provide means, closely adjacent the foreground, whereby to simulate the bursts of spray on the rocks of the foreground.

Other objects have to do with the details of construction and arrangement of parts as will appear more fully hereinafter.

My invention is illustrated in the accompanying drawings wherein:

Figure 1 is a front elevation of my display device.

Figure 2 is a vertical section thereof from front to rear.

Figure 3 is a section on the line 3—3 of Figure 4.

Figure 4 is a section on the line 4—4 of Figure 2.

Figure 5 is a side elevation of the pulley-carrying ends of the rollers.

Figure 6 is a cross section through one of the rollers.

Referring to these drawings, 10 designates a casing within which the seascape is disposed. The floor of this casing is designated 11 and the top is designated 12. Lamps 13 are disposed in the top of the casing and shielded so as to give indirect lighting to the scene. The front of the casing may be provided with a glass pane 14. A casing of this kind may be of any desired size, but ordinarily it is approximately 5½ ft. wide, 4 ft. in height and 5 ft. from front to rear. At the rear of the casing, there is painted either on the rear wall of the casing or upon a curtain of canvas or the like, a background 15 representing distant islands, for instance, clouds and whatever scenery might be appropriate to a seascape. This background may be made removable, if desired, so that backgrounds may be interchanged, as well as the foreground.

At the front of the casing there is disposed a unit 16 formed to represent the foreground of a seashore. This foreground is modeled to represent a section of landscape adjacent the sea and may be formed to simulate rocks, trees, sand, etc., the rear of the foreground being preferably built up so that it has some height above the bottom or floor of the casing.

Between the rear of the foreground and the background there is a third unit, counting the background as one unit, this third unit being designated generally 17. This third unit consists of opposed frames 18 which, as shown, have their upper edges extending upward and rearward, and supported upon the upper edges of these frames are a plurality of parallel rollers 19. One of these rollers, as for instance the foremost roller, is provided at one end with a band-wheel 20 and at its other end with a pulley 21. All of the other rollers are provided with pulleys 21a and a band 22 extends over this entire set of pulleys 21a as shown in Figure 5, so that when the pulley 21 is rotated in one direction, all of the pulleys 21a will also be rotated and thus rotate the rollers 19 all in the same direction. Any desired means may be used for keeping the band 22 taut. Thus for instance, the endless band may pass between rollers 23, as shown in Figure 5. The band-wheel 20 is driven from a small pulley or band-wheel 24 mounted upon a shaft 25, which carries a large band-wheel 26 in turn driven from a small pulley or wheel 27 on a shaft 28, this shaft carrying a large band-wheel 29 which runs over a small pulley 30 carried by an electric motor 31. Thus the speed of the electric motor will be greatly reduced so that the rollers 19 will be rotated at a relatively low speed.

These rollers 19 may be made of wood and, as shown in Figure 3, they may be covered with screen wire or the like material coated with plaster of Paris and molded irregularly so as to show whitecaps, breaking waves and the like incident details of wave forms. Thus, for instance, the foremost roller of the series of rollers 19 is shown in the drawings as formed to simulate a wave whose crest has been broken at a plurality of points while the next adjacent roller is formed to simulate a wave just about to break at points intermediate the "break" of the foremost wave on the first roller. Of course, the rollers 19, as they are disposed serially rearward, will each have less and less of a breaking wave formed upon them so that the rearmost rollers will merely show whitecaps or such details as would be only observable from a distance so as to give the effect of aerial perspective. The rollers might be covered with stiffened cloth and painted, or with fine wire netting and plaster of Paris, as before stated, or formed in any way so as to give the simulation of a rolling sea with breakers breaking against the rocks of the foreground. Inasmuch as the rollers 19 are all rotating in one direction, it follows that anyone looking in through the glass pane 14 will see an apparently constantly moving, constantly tumbling sea with breakers breaking against the rocks.

In order to simulate bursts of spray at the point where the breakers are supposed to break against the rocks, I provide spray elements 32 which may be cut out of Celluloid, pyralin, Cellophane or any other suitable material cut and painted to represent bursts of spray. There may be as many of these disposed between the foremost roller 19 and the rear of the foreground as desired. Each of these elements 32 is shown as mounted upon the free end of a lever 33 pivoted, for instance, at 34, this lever being raised or lowered by means of a second or operating lever 35 in turn operated by a cam 36. The foremost roller of the series 19 has a bearing near the middle of the roller and one or more cams 36 are mounted upon this foremost roller at irregularly spaced distances, these cams acting upon the several levers 33.

As shown in Figure 4, two of the levers 33 are crossed over a single operating lever 35 so that both of these levers 33 will be raised at their free ends simultaneously but it is to be understood that there might be as many cams 36 as there are levers 33, or a plurality of levers might be operated by one cam, and that the levers may be timed in any order desired, so as to provide that bursts of spray shall apparently rise irregularly from behind various rocks of the foreground.

I have shown these levers as operated by cams on the foremost roller 19, but it is obvious that a shaft may be used in place of the roller 19 in order to operate these levers 33 which carry the elements simulating bursts of spray. I therefore do not wish to be limited, except as defined in the appended claims, to the use of cams 36 mounted upon the foremost roller of the series of rollers 19.

It will be understood that two of the elements, namely, the background 15 and the foreground 16, may be made removable so as to be changed from time to time, the tumbling sea remaining constant.

In order to overcome the difficulty of constructing the imitation of a wave that would run up on a beach or in order to avoid the appearance of a wave not running up on a beach or low portion of the foreground when it should do so, I have provided a strip or strips of pyralin designated 37. This strip is sprayed in imitation of blowing sand or mist and is installed between the foreground and the forwardmost roller 19 to thus conceal or veil the surface which might be covered by waves running up on a beach or a low portion of the foreground. Such a low portion of the foreground is indicated by dotted lines in Figure 2. This misty screen of pyralin permanently veils the break which would occur between the foreground and the forwardmost roller 19.

The lamps 13 are concealed, one set of lamps by the frame 18 at the forward end of the box or casing, and the other set of lamps by an intermediate depending member 38, as shown in Figure 2, so as to secure indirect lighting.

Preferably, and as shown particularly in Figure 3, mirrors 39 will extend from front to rear of that portion of the casing within which the rollers 19 are mounted. These mirrors may be slightly convergent toward the rear or parallel to each other and the purpose of these mirrors is to mask the ends of the rollers so that an observer in a close-up position and considerably to one side of the casing 10 will see a reflection of the rolling sea and of the back-drop or painting so that these mirrors seem to continue the rollers out into space. Of course, these mirrors are so arranged as not to prevent the free turning of the rollers. Sheets of paper or other fabric designated 40 are preferably attached to the forward edges of the mirrors and carried downward and outward to the forward corners of the casing 10, as shown in Figure 3. Preferably the corners of the foreground are blocked out by simulations of rocks or trees designated 41. The strip of pyralin designated 37 and which is given a misty or sandy appearance and which partially veils the first roller of the series can be used in any position desired either in front of the rollers or between the rollers and if used between the rollers may represent smoke as from a vessel, a mist, or clouds hanging in the air at any point.

It is to be understood that when I refer to the foreground as being one unit in the composition, I do not mean to limit myself to a construction in which the foreground is one solid piece. It is obvious that the foreground might be composed of sand, individual rocks, individual models of trees, pieces of glass to represent pools of water, etc. and that when the foreground is changed, these elements could be shifted at the pleasure of the composer of the picture into any desired relation.

It is obvious that the units which I have provided and the mechanism which I have illustrated for the purpose of simulating a tumbling sea might be disposed in a large variety of different relations and that a great variety of very natural and extremely interesting animated display pictures might be thus provided, therefore, it is obvious that I do not wish to be limited to the details of construction except as defined in the appended claims.

What is claimed is:—

1. A display device including a casing open at its front and having a background on its rear wall, the floor of the casing at its front having a foreground modeled in relief to simulate a seashore, a plurality of parallel rollers extending across the middle portion of the floor and having the peripheries thereof formed to simulate oncoming waves, means for simultaneously rotating all of said rollers in the same direction, and means at the rear of the foreground and forward of the first roller of the series constructed and arranged to simulate rising and falling bursts of spray.

2. A display device including a casing open at its front and having a background on its rear wall, the floor of the casing at its front having a foreground modeled in relief to simulate a seashore, a plurality of parallel rollers extending across the middle portion of the floor and having the peripheries thereof formed to simulate oncoming waves, means for simultaneously rotating all of said rollers in the same direction, painted elements disposed between the foreground and the first roller of the series formed to represent bursts of spray, the elements being independent of each other, and means for vertically reciprocating said spray indicating elements.

3. A display device including a casing open at its front and having a background, the floor of the casing at its front having a foreground modeled to represent a seashore, the upper surface of the foreground being disposed at least at the rear of the foreground at a height above the floor of the casing, a plurality of parallel rollers extending across the middle portion of the floor and disposed closely adjacent each other, each of said rollers being formed upon its surface to simulate wave forms, the rollers adjacent the foreground being formed to represent breaking waves, means for simultaneously rotating all of said rollers in the same direction, a plurality of vertically movable elements disposed at irregular intervals between the background and the foremost roller and painted to represent bursts of spray, said elements when lowered being hidden by the foreground, and means for vertically reciprocating said spray indicating elements into and out of position behind the foreground.

4. A display device including a casing open at its front and having a background, the floor of the casing at its front having a foreground modeled to represent a seashore, the upper surface of the foreground being disposed in part at the rear of the foreground at a height above the floor of the casing, a plurality of parallel rollers extending across the middle portion of the floor and disposed closely adjacent each other, each of said rollers being formed upon its surface to simulate wave forms, the rollers adjacent the foreground being formed to represent breaking waves, means for simultaneously rotating all of said rollers in the same direction, a plurality of vertically movable elements disposed at irregular intervals between the background and the foremost roller and painted to represent bursts of spray, said elements when lowered being hidden by the foreground, means for vertically reciprocating said spray indicating elements into and out of position behind the foreground, said means including levers upon which the elements are respectively mounted, and constantly rotating cams engaging said levers.

5. A display device including a casing open at its front and having a background, the floor of the casing at its front having a background modeled to represent a seashore, the upper surface of the foreground being disposed at least at the rear of the foreground at a height above the floor of the casing, a plurality of parallel rollers extending across the middle portion of the floor and disposed closely adjacent each other, each of said rollers being formed upon its surface to simulate wave forms, the rollers adjacent the foreground being formed to represent breaking waves, means for simultaneously rotating all of said rollers in the same direction, a plurality of vertically movable elements disposed at irregular intervals between the background and the foremost roller and painted to represent bursts of spray, said elements when lowered being hidden by the foreground, means for vertically reciprocating said spray indicating elements into and out of position behind the foreground, said means including levers upon which the elements are respectively mounted, and constantly rotating cams engaging said levers, said cams being mounted upon the foremost roller of the series.

6. In a display device of the character described, an imitation sea comprising a supporting frame, a series of closely adjacent rollers mounted upon the frame, the surface of each roller being formed and painted to represent wave forms, means for rotating all of said rollers in the same direction, comprising pulleys mounted upon the ends of the several rollers, an endless band passing over all of said pulleys and held in frictional engagement therewith, and motor operated means for driving one of said rollers to thereby drive all of the rollers and including means for transmitting the power of the motor at a reduced speed to said rollers.

7. A display device, including a casing open at its front and having a background adjacent its rear wall, the floor of the casing at its front having a foreground modeled in relief to simulate a seashore, a plurality of parallel rollers extending across the middle portion of the floor and having the peripheries thereof formed to simulate oncoming waves, means for simultaneously rotating all of said rollers in the same direction, means at the rear of the foreground and forward of the first roller constructed and arranged to simulate rising and falling bursts of spray, and a strip of thin semi-transparent misty material disposed between the foreground and the first roller and veiling said first roller.

8. A display device, including a casing open at its front and having a background, the floor of the casing at its front having a foreground modeled in relief to simulate a seashore, a plurality of parallel rollers extending across the floor rearward of the foreground and having the peripheries thereof formed to simulate oncoming waves, means for simultaneously rotating all of said rollers in the same direction, and mirrors disposed at the sides of the casing inward of the ends of said rollers and confronting each other, the mirrors extending from the rear toward the front of the casing to a point in advance of the foremost rollers of the series.

9. A display device, including a casing open at its front and having a background, the floor of the casing at its front having a foreground modeled in relief to simulate a seashore, a plurality of parallel rollers extending across the floor rearward of the foreground and having the peripheries thereof formed to simulate oncoming waves, means for simultaneously rotating all of said rollers in the same direction, mirrors disposed at the sides of the casing inward of the ends of said rollers and confronting each other, the mirrors extending from the rear toward the front of the casing to a point in advance of the foremost rollers of the series, and sheets of material extending from the forward edge of said mirrors to the forward corners of the casing.

10. A display device of the character described, including a casing open at its front and having a background on its rear wall, the casing at its front having a foreground simulating a seashore, a plurality of parallel rollers extending across the floor rearward of the foreground and having the peripheries thereof formed in relief to represent sinuous wave forms, the sinuosities extending longitudinally of the rollers, and means for rotating all of said rollers in the same direction.

11. A display device including a casing open at its front and having a background, the floor of the casing at its front having a foreground modeled in relief to simulate a seashore, a plurality of closely adjacent parallel rollers extending across the middle portion of the floor and having the peripheries thereof formed to simulate oncoming waves, and means for simultaneously rotating all of said rollers in the same direction.

HERBERT R. DIETLEIN.